United States Patent [19]

Hayamizu

[11] Patent Number: 4,476,519
[45] Date of Patent: Oct. 9, 1984

[54] ANNULAR ILLUMINATION DEVICE

[75] Inventor: Toshisada Hayamizu, Hachiouji, Japan

[73] Assignee: Olympus Optical Co., Ltd., Tokyo, Japan

[21] Appl. No.: 406,913

[22] Filed: Aug. 10, 1982

[30] Foreign Application Priority Data

Aug. 13, 1981 [JP] Japan .................. 56-125932

[51] Int. Cl.³ .............................. F21V 7/04
[52] U.S. Cl. ..................... 362/32; 362/259; 362/287; 362/308; 362/311; 362/331; 362/335; 350/96.18; 350/96.24
[58] Field of Search ............... 362/32, 259; 350/96.18, 350/96.24; 330/4.3

[56] References Cited

U.S. PATENT DOCUMENTS

| | | | |
|---|---|---|---|
| 3,600,594 | 8/1971 | Moore | 350/96.18 X |
| 3,663,822 | 5/1972 | Uchida | 350/96.18 X |
| 3,669,524 | 6/1972 | Shio | 362/32 X |
| 3,922,618 | 11/1975 | Tavin | 330/4.3 X |
| 4,042,823 | 8/1977 | Decker et al. | 350/96.18 X |
| 4,054,364 | 10/1977 | Webster | 350/96.18 |
| 4,072,416 | 2/1978 | Waly | 353/27 R X |
| 4,361,863 | 11/1982 | Hagner | 362/32 |

FOREIGN PATENT DOCUMENTS 48-32124 10/1973 Japan .
52-2442 1/1977 Japan ................ 350/96.18

OTHER PUBLICATIONS

Kahl, *Fiber Optics in Electronics,* Electronics World, May 1965, pp. 25-28.

*Primary Examiner*—Peter A. Nelson
*Attorney, Agent, or Firm*—Cushman, Darby & Cushman

[57] ABSTRACT

An annular illumination device comprising a tubular light transmitter, a light source means able to project parallel light rays onto an entrance end face of the tubular light transmitter from a direction intersecting diagonally with the entrance end face and a light collecting lens collecting conical light bundle coming out of an exit end face of the tubular light transmitter to form an image of an annular light in order to make it possible to make a bright efficient annular illumination. The angle formed by the parallel light rays with the entrance end face of the tubular light transmitter can be varied in order to vary the diameter of the image of the annular light.

7 Claims, 3 Drawing Figures

4,476,519

ANNULAR ILLUMINATION DEVICE

BACKGROUND OF THE INVENTION (a) Field of the invention

This invention relates to annular illumination devices to be used for phase-contrast microscopes and super-resolution microscopes.

(b) Description of the invention

For example, as shown in FIG. 1, an optical system of a conventional phase-contrast microscope is formed of an illuminating system consisting of a light source 1, a collector lens 2 and relay lens 3 for making lights coming out of the light source 1 parallel lights, a ring slit 4 arranged in the rear of the relay lens 3 and a condenser lens 5 having a front focal point arranged so as to substantially coincide with the ring slit 4, making the light having passed through the ring slit 4, that is, an annular light a conical light bundle and projecting it diagonally onto an object S and an observing system consisting of an objective 6, a phase plate arranged in a position conjugate with the ring slit 4 with respect to the optical system including the objective 6 and condenser lens 5 so that the image by the condenser lens 5 and objective 6 of the ring slit 4 may overlap on it and an eyepiece not illustrated. However, as the numerical aperture NA of the light passing through the object S is usually about ½ the numerical aperture of the objective 6, the magnification of the objective 6 is 10 to 100 times and the numerical aperture varies from 0.25 to 1.25, it has been necessary to vary the diameter of the ring slit 4 in response to the numerical aperture of the objective 6. Therefore, in this kind of conventional illuminating system, usually a plurality of ring slits 4 different in the diameter are concentrically arranged on a rotary plate so that a ring slit of a proper diameter may be properly selected and used by rotating the rotary plate in response to the numerical aperture of the objective 6. However, it has a defect that the operation is difficult. Further, in the case of this illuminating system, only a part of the light rays from the light source 1 will be passed through the ring slit 4. Therefore, there have been problems that the light amount loss is large and that the visual field is dark.

SUMMARY OF THE INVENTION

An object of the present invention is to provide a bright efficient annular illumination device wherein the diameter of an annular light can be simply varied.

According to the present invention, this object is attained by projecting substantially parallel light rays onto an entrance end face of a tubular light transmitter from a direction intersecting diagonally with the entrance end face and collecting with a light collecting lens a conical light bundle projected out of an exit end face of the tubular light transmitter to form an image of an annular light. The angle of the parallel light rays with the entrance end face of the tubular light transmitter can be varied in order to vary the diameter of the image of the annular light.

The tubular light transmitter may be any of optical fibers, a glass bar or a hollow pipe finished on the inner surface to be well reflective. A glass bar silver-plated on the outer peripheral surface can be used. Flexible optical fibers can be used.

DESCRIPTION OF THE PREFERRED EMBODIMENTS

Figure 1:
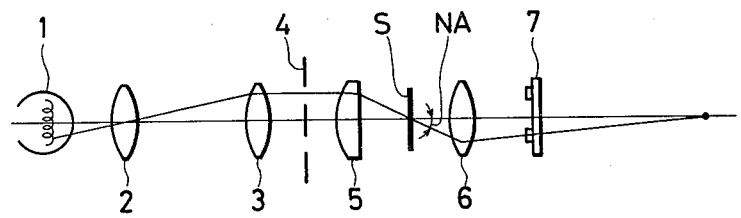
FIG. 1 is a view showing an example of an optical system of a conventional phase-contrast microscope.
Figure 2:
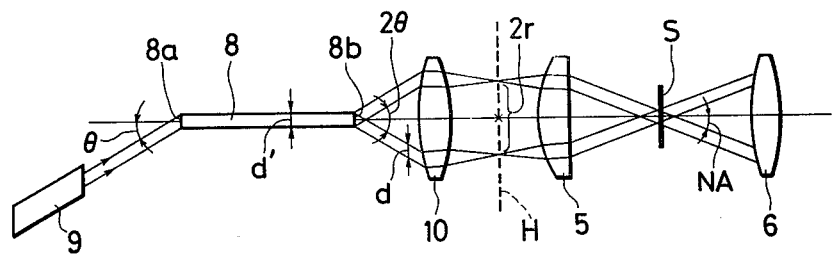
FIG. 2 is a view showing an optical system of an embodiment of an annular illumination device according to the present invention.

First, the present invention shall be described in detail with reference to the embodiment shown in FIG. 2. In this embodiment, the same reference numerals are attached to substantially the same members as are used in the conventional example explained with reference to FIG. 1. The reference numeral 8 denotes optical fibers, 9 denotes a laser light source arranged on the entrance end face 8a side of the fibers 8 and able to project onto the entrance end face 8a laser beams, that is, substantially parallel light rays as intersected diagonally with the entrance end face 8a and 10 denotes a light collecting lens arranged so that a front focal point may coincide with an exit end face 8b of the fibers 8, a rear focal point may coincide with a front focal point of the condenser lens 5 and the optical axis may intersect at right angles with the exit end face 8b to collect lights projected out of the fibers.

As the annular illumination device according to the present invention is formed as described above, if the angle of the optical axis of the light bundle from the light source with the axis intersecting at right angles with the entrance end face 8a is $\theta$, the light bundle projected out of the exit end face will be conical with an apex angle of $2\theta$ by the characteristics of the fibers 8. If the influence of the diffraction is neglected, the thickness d of the conical light bundle will be substantially equal to the diameter d' of the fibers 8. Further, as the front focal point of the light collecting lens 10 coincides with the exit end face 8b of the fibers 8 and the optical axis of the light collecting lens 10 intersects at right angles with the exit end face 8b of the light collecting lens 10, the above mentioned conical light bundle will be focused as an image of fine annular light on a rear focal plane H of the light collecting lens 10. In this case, if the radius is r and the focal length of the light collecting lens 10 is $f_F$, $r \doteq f_F \sin \theta$ and the annular light of a diameter of $2r$ will be the same as the annular light made by the ring slit 4 in the above mentioned conventional example. Further, the position of the image of the annular light coincides with the front focal point of the condenser lens 5. Therefore, the same as in the above mentioned conventional example, the annular light will be made conical light bundle by the condenser lens 5 and will be projected diagonally onto the object S. In this case, if the focal length of the condenser lens 5 is $f_c$, the numerical aperture NA of the light projected onto the object S will be $$NA = \frac{r}{f_c} \approx \frac{f_F}{f_c} \sin \theta.$$

Therefore, if the inclination of the laser light source 9 is varied to vary the angle $\theta$ of the optical axis of the light bundle from the light source with the axis intersecting at right angles with the entrance end face 8a of the fibers 8, the diameter 2r of the annular light will be varied and the numerical aperture NA will be able to be very easily varied. Also, in the present illumination device, as evident from the above mentioned explanation, most of light from the light source are converted to the annular illuminating light which is bright and efficient.

Figure 3:
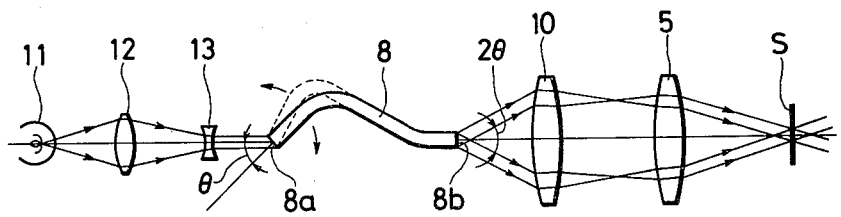
FIG. 3 is a view showing an optical system of another embodiment of an annular illumination device according to the present invention.

FIG. 3 shows another embodiment in which flexible optical fibers 8 are used, the exit end face 8b of the fibers 8 is fixed, the inclination of the entrance end part of the fibers 8 is varied as illustrated by the dotted lines to vary the angle $\theta$ of the optical axis of the light bundle with the axis intersecting at right angles with the entrance end face 8a and a light bundle consisting of fine parallel light rays is produced by a light source 11 which is nearly a point light source and a collector lens 12 and relay lens 13 which are respectively a convex lens and concave lens. In this case, the light source 11 is preferably as small and bright as possible. For example, a xenon discharge tube or the like is adapted.

By the way, in each of the above mentioned embodiments, the fibers 8 are used but the invention is not limited to the fibers, that is to say, the tubular light transmitter may be a glass bar (which may be silverplated on the periphery) or a hollow pipe (well reflective on the inner surface). The front focal point of the light collecting lens 10 need not always coincide with the exit end face 8b of the fibers 8 but, if it coincides, the diameter of the annular light projected out of the light collecting lens 10 will be constant and will be preferable.

As in the above, the annular illumination device according to the present invention has very important advantages that the diameter of the annular light can be easily varied, that the device is bright and efficient, that the device is adapted as an illumination device for a phase-contrast microscope or superresolution microscope and that an image of fine annular light can be obtained.

I claim:

1. An annular illumination device comprising a light source means capable of projecting substantially parallel light rays, a tubular light transmitter having its entrance end face and its exit end face both inclined to said light rays and capable of transmitting said light rays with its inner face reflections, a light collecting lens arranged so that its front focal point coincides with the exit end face of said tubular light transmitter and capable of collecting a conical light bundle projected out of the exit end face of said tubular light transmitter to form an image of an annular light, and a condenser lens arranged so that its front focal point coincides with a rear focal point of said light collecting lens.

2. An annular illumination device according to claim 1 wherein said light source means can move to vary the angle formed by said light rays with said entrance end face to vary the diameter of the image of said annular light.

3. An annular illumination device according to claim 1 or 2 wherein said tubular light transmitter is a member selected from the group consisting of optical fibers, a glass bar and a hollow pipe finished on the inner surface so as to be well reflective.

4. An annular illumination device according to claim 1 or 2 wherein said tubular light transmitter is formed of flexible optical fibers to vary the angle formed by said light rays with said entrance end face to vary the diameter of the image of said annular light.

5. An annular illumination device according to claim 1 or 2 wherein said light source means is a laser light source.

6. An annular illumination device according to claim 1 wherein said light source means consists of a xenon discharge tube as a light source, a collector lens and a relay lens.

7. An annular illumination device according to claim 1 or 2 wherein said tubular light transmitter is formed of flexible optical fibers to vary the angle formed by said light rays with said entrance end face to vary the diameter of the image of said annular light and wherein said light source means consists of a xenon discharge tube as a light source, a collector lens and a relay lens.

* * * * *